April 17, 1934.    H. T. HALL    1,955,630
GLASS REPLACEMENT TOOL
Filed July 21, 1933    2 Sheets-Sheet 1
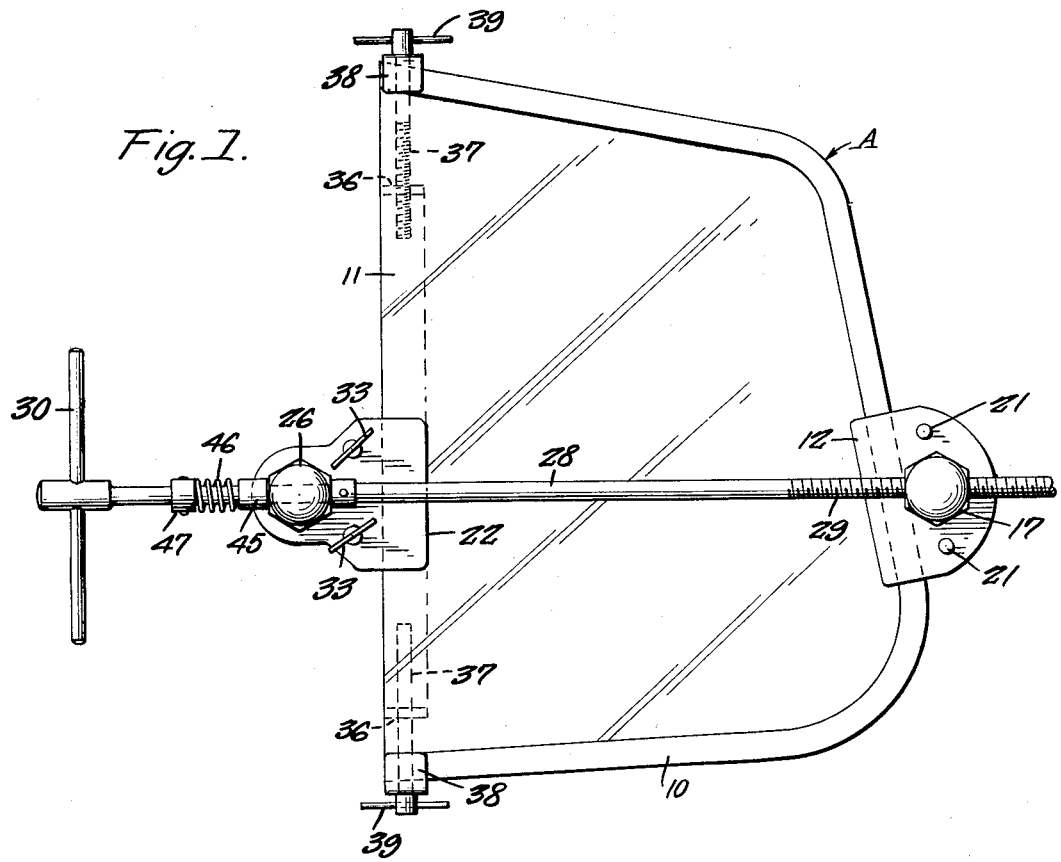
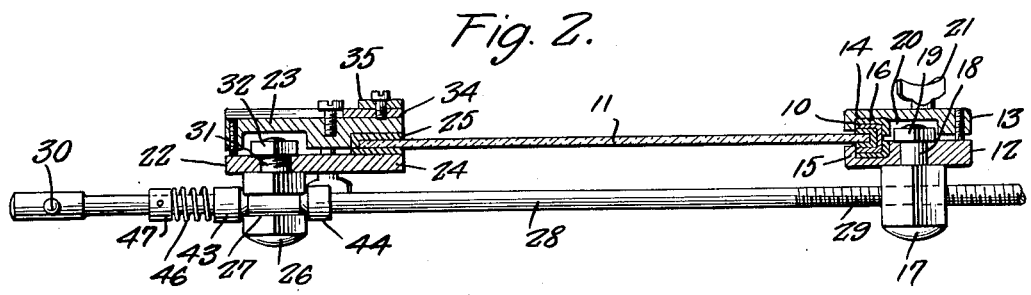
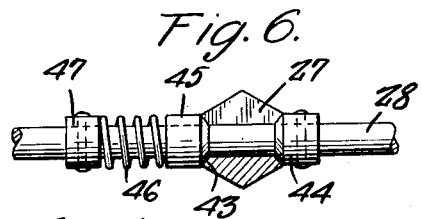
Harry T. Hall, INVENTOR
BY Victor J. Evans & Co.
ATTORNEY April 17, 1934.  H. T. HALL  1,955,630
GLASS REPLACEMENT TOOL
Filed July 21, 1933   2 Sheets-Sheet 2
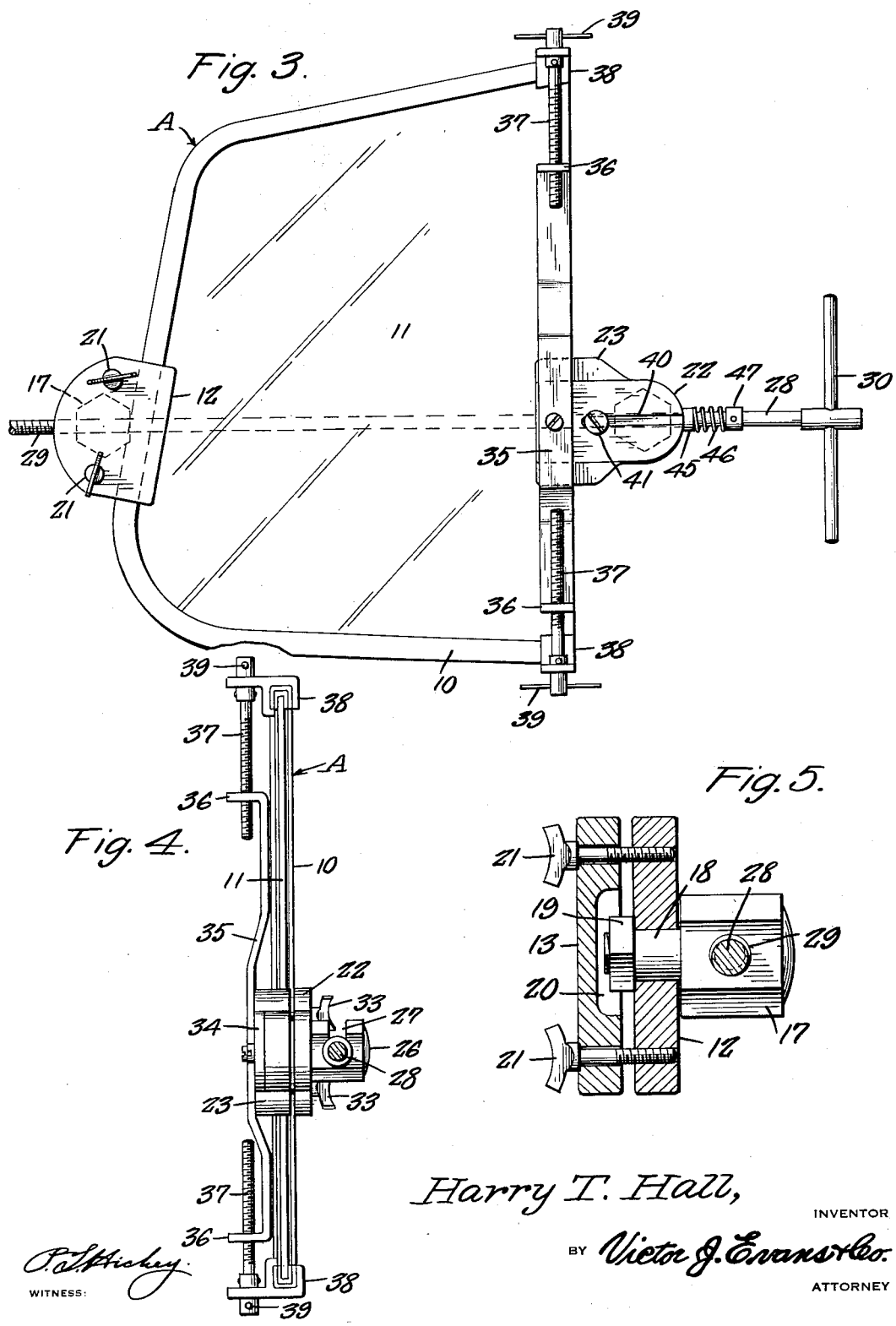
Harry T. Hall,
INVENTOR Patented Apr. 17, 1934

1,955,630

UNITED STATES PATENT OFFICE 1,955,630

GLASS REPLACEMENT TOOL

Harry T. Hall, Union City, Ind.

Application July 21, 1933, Serial No. 681,604

3 Claims. (Cl. 29—84)

The invention relates to a glass replacement tool and more especially to a combination tool for removing, installing and reclamping ventilator window glass.

The primary object of the invention is the provision of a tool of this character, wherein in the breaking of the glass of "no draft" ventilators used on automobiles, the said glass can be conveniently removed and new glass placed within the ventilators with dispatch, the tool being of novel construction and in its working eliminating the necessity of the removal of the ventilators from the automobile for replacement of glass therein.

Another object of the invention is the provision of a tool of this character, wherein a broken glass within a ventilator of the "no draft" type can be easily and conveniently handled for replacement of the broken glass without liability of injury to an operator of the tool or damage to the ventilator frame.

A further object of the invention is the provision of a tool of this character which is simple in construction, thoroughly reliable and efficient in its purpose, light of weight yet strong and durable, readily and easily applied and removed to and from a ventilator, susceptible of adjustment for accommodating itself to the ventilator frame and the glass therein, and also inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is an elevation of the tool constructed in accordance with the invention and shown applied to a ventilator frame of the "no draft" ventilator type.

Figure 2 is a horizontal sectional view thereof.

Figure 3 is a view similar to Figure 1 looking toward the opposite side of the ventilator.

Figure 4 is an edge elevation.

Figure 5 is a fragmentary sectional view through one of the clamps.

Figure 6 is a fragmentary detail sectional view showing the adjusting rod and its releasable engagement with a swivel head of the tool.

Similar reference characters indicate corresponding parts throughout the several views in the drawings.

Referring to the drawings in detail, A designates generally a ventilator which, in this instance, is representative of the "no draft" ventilator now employed in the modern style of closed automobiles and includes a frame 10 of the shape styled in Figures 1 and 3 and supports therein a glass panel 11, the frame 10 being open at its wider end with the edge of the glass exposed at this end, the ventilator being shown to merely illustrate the application and the use of the tool constituting the present invention and hereinafter fully described.

The tool comprises a ventilator frame clamp including a pair of cheeks 12 and 13, respectively, these being alike to each other in marginal contour and cut into at their inner faces at 14 to provide clamping jaws 15, the cut-in portions 14 being provided with soft facings 16 for contact with the frame 10 without scarring or otherwise damaging the surface finish thereof. The cheek 12 has pivoted thereto a swivel head 17, its pivot stud 18 being passed through a suitable hole in the cheek 12 and being swiveled by a nut 19 on the stud, the cheek 13 being provided with a countersink 20 for a clearance for the nut 19 at the inner side of said cheek 13. The cheek 13 is connected with the cheek 12 by a pair of winged screws 21, these being loosely passed through the cheek 13 and threaded in the cheek 12 at opposite sides with respect to the pivot stud 18 of the head 17. On working the screws 21 inwardly of the cheek 12 the jaws 15 of said cheeks will be brought into clamping engagement with the frame 10 of the ventilator A, as will be apparent in Figure 2 of the drawings.

Mountable on the exposed edge of the glass panel 11 is a panel clamp including the cheeks 22 and 23, respectively, these being alike to each other in their marginal formation and forming jaw portions 24 carrying at their inner faces soft facings 25 for contact with the panel 11 on the application of the clamp thereto. The cheek 22 pivotally supports a swivel head 26 having a notch or slot 27 extending for a distance thereinto and opening through one side of the same for releasably receiving an adjusting rod 28 having the threaded end portion 29 tapped into the head 17, while the opposite end of said rod carries a crossed handle bar or piece 30 for the manual working of said rod. The head 26 has its pivot stud 31 loosely passed through the cheek 23 and swiveled thereto by a nut 32 carried by said stud 31. The cheek 23 is connected for adjustment with the cheek 22 by winged screws 33 which are loosely passed through said cheek 22 and threaded in the cheek 23 at opposite sides with respect to the head 26 so that the panel clamp can be mounted upon the exposed edge of the panel 11 and the jaws 24 gripping the same.

Mounted upon the cheek 23 at the outer side thereof is an adjustable plate 34 carrying a bracket 35 which is disposed crosswise thereof and having the outturned ears 36 with which are engaged adjusting screws 37. These screws 37 at their outer ends have swiveled thereto end clamps 38 which engage and grip the ends of the frame 10, as is clearly apparent in Figure 4 of the drawings. By adjustment of the screws 37 the ends of the frame can be outwardly spread for releasing the panel 11 seated within the frame 10 and also these ends of the frame 10 can be contracted for the fitting of a new glass panel within said frame 10, when the occasion requires. Each screw 37 carries a crossed handle bar 39.

The plate 34 is provided with an elongated slot 40 receiving a set screw 41 which is threaded into the cheek 23 and in this manner the said plate 34 is adjustably connected with the cheek 23.

The cheeks 13 and 23 each carries a regulating screw 42 for the setting of the jaws 14 and 24 to assure gripping action thereof upon the work.

The swivel head 26, at opposite sides thereof, in communication with the slot 27 therein, has provided the inset seats 43, one accommodating an abutment collar 44 stationarily fixed to the rod 28 and the other accommodating a retaining collar 45 slidably fitted on said rod and tensioned by a coiled expansion spring 46 working against the collar 45 and a fixed bearing 47, respectively, the bearing 47 being stationarily mounted upon the rod 28. Thus it will be seen that by the collars 44 and 45 the rod can be latched in the slot 27 in the head 26 and manually released to permit the swinging of the rod 11 in an upward direction for convenience in the removal of the tool or the application thereof in the mounting of the clamps upon the frame 10 and the panel 11 or the demounting of said clamps therefrom.

In the use of the tool, when the frame clamp is engaged with the frame 10 and the panel clamp is engaged with the glass 11 at its exposed edge with the rod 28 latched in the swivel head 26, on the turning of the rod for screwing the same outwardly from the head 17 the glass or panel 11 can be conveniently removed from the frame 10 with dispatch. The tool is employed for the removal of broken glass from the ventilator frame 10 and the replacement of new glass, as should be clearly apparent.

The clamping jaws 15 are provided with the lips 48 for holding the frame in position while pulling out the glass panel.

It will be apparent that the glass clamp holding the broken glass can be removed without removing the frame clamp or the cross bracket 35. This is also true when inserting a new glass in the frame of the ventilator.

The frame clamp is susceptible of mounting on any shape or angle of a frame, this being possible by the swivel joint at 17, as shown in Figure 2 of the drawings.

What is claimed is:

1. A tool of the character described comprising a pair of clamps, one for engagement with a frame of a "no draft" ventilator and the other with a glass in said frame, swivel heads on said clamps, a hand screw threaded in one head and detachably latched with the other head, and clamping means carried by the glass clamp and arranged at right angles to the hand screw for engagement with the ends of the frame and provided with means to spread or contract the ends of said frame.

2. A tool of the character described comprising a pair of clamps, one for engagement with a frame of a "no draft" ventilator and the other with a glass in said frame, swivel heads on said clamps, a hand screw threaded in one head and detachably latched with the other head, clamping means carried by the glass clamp and arranged at right angles to the hand screw for engagement with the ends of the frame and provided with means to spread or contract the ends of said frame, and means for securing said clamping means in adjusted position on the glass clamp.

3. A tool of the character described comprising a pair of clamps, one for engagement with a frame of a "no draft" ventilator and the other with a glass in said frame, swivel heads on said clamps, a hand screw threaded in one head and detachably latched with the other head, clamping means carried by the glass clamp and arranged at right angles to the hand screw for engagement with the ends of the frame and provided with means to spread or contract the ends of said frame, means for securing said clamping means in adjusted position on the glass clamp, one of said heads being formed with a notch for the releasable latching of the screw therewith, and a spring tensioned latching means on the screw for its latching engagement in the notch.

HARRY T. HALL.